United States Patent
Becker

[15] 3,653,181
[45] Apr. 4, 1972

[54] DELIQUESCENT DESICCANT GAS DRYER AND METHOD

[72] Inventor: Philip S. Becker, Erie, Pa.
[73] Assignee: Van-Air Incorporated, Erie, Pa.
[22] Filed: Mar. 9, 1971
[21] Appl. No.: 122,540

Related U.S. Application Data

[63] Continuation of Ser. No. 808,867, Mar. 20, 1969, abandoned.

[52] U.S. Cl. ................................................ 55/35, 55/388
[51] Int. Cl. ........................................................ B01d 53/02
[58] Field of Search ........................... 55/35, 221, 281, 388

[56] References Cited

UNITED STATES PATENTS

| | | |
|---|---|---|
| 3,303,621 | 2/1967 | Hill ................................................ 55/388 |
| 3,312,041 | 4/1967 | Hill ................................................ 55/388 |
| 1,866,207 | 7/1932 | Hansen ............................................ 55/388 |

*Primary Examiner*—Charles N. Hart
*Attorney*—Baldwin, Egan, Walling & Fetzer

[57] ABSTRACT

A deliquescent desiccant type air or gas drier adapted to contain a bed of deliquescent desiccant chemical material through which the air or gas is adapted to flow, to remove moisture from the compressed air or gas stream. The gas inlet to the drier is disposed in the upper portion of the drier housing and the gas outlet to the drier is disposed in the lower portion of the drier housing, so that the inlet air or gas flows downwardly through the bed of deliquescent chemical material, thus resulting in the deliquescent solution from the bed of chemical material flowing downwardly in the same direction of flow as the inlet air or gas. This arrangement increases the life and moisture removing efficiency of the desiccant chemical bed, increases the life of the drier, and increases the efficiency of the drying operation. A novel method of drying an air or gas stream is also provided.

14 Claims, 5 Drawing Figures

PATENTED APR 4 1972
3,653,181
SHEET 1 OF 2
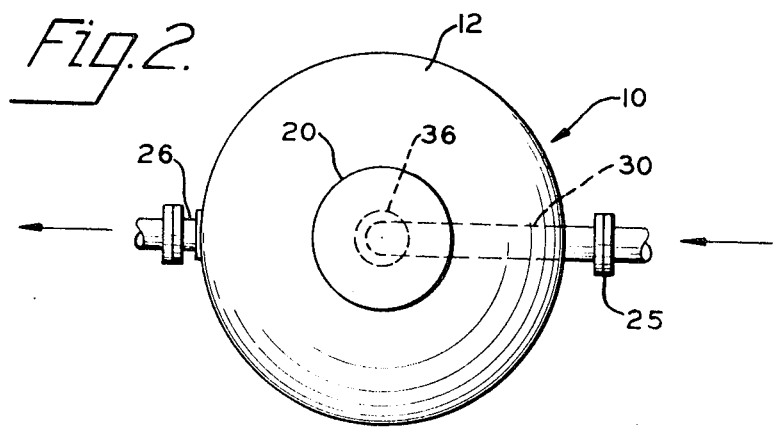
Fig. 2.
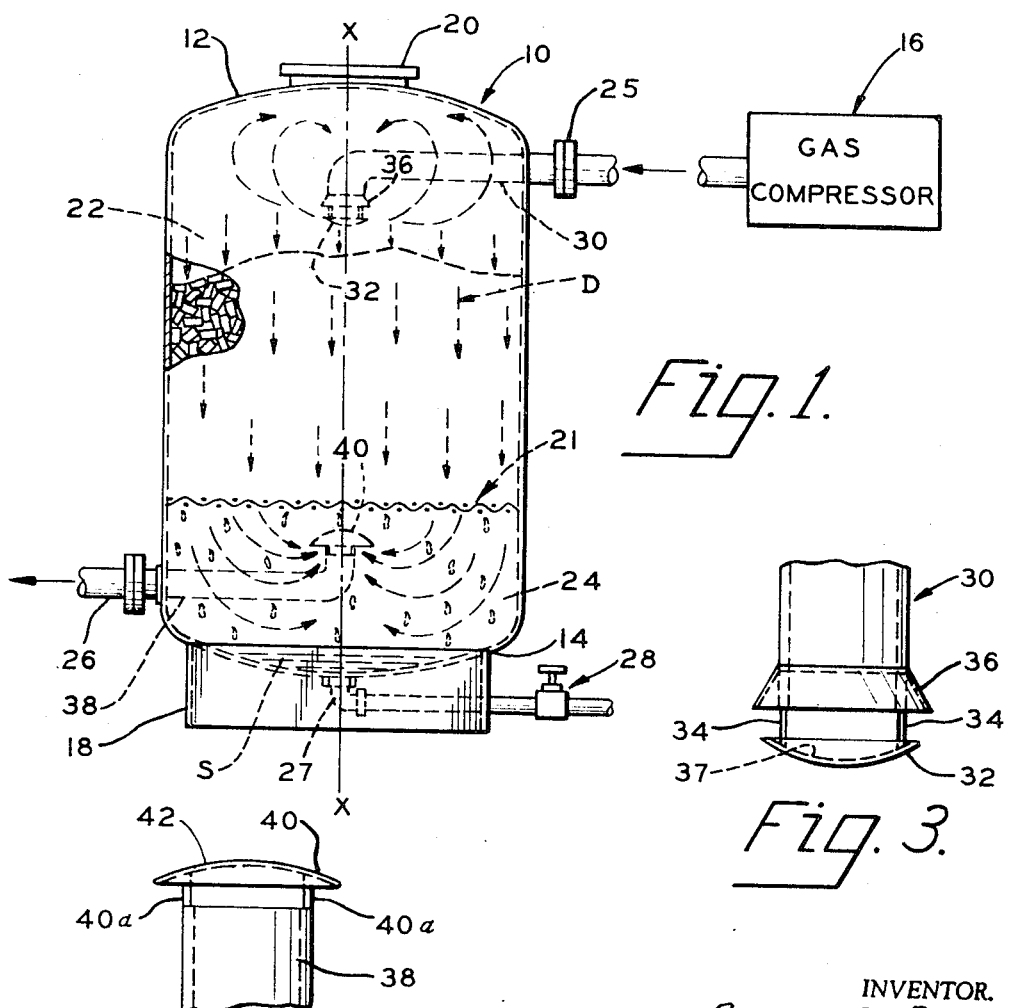
Fig. 1.
Fig. 3.
Fig. 4.
INVENTOR.
PHILIP S. BECKER
BY
Baldwin, Egan, Walling & Fetzer
ATTORNEYS.

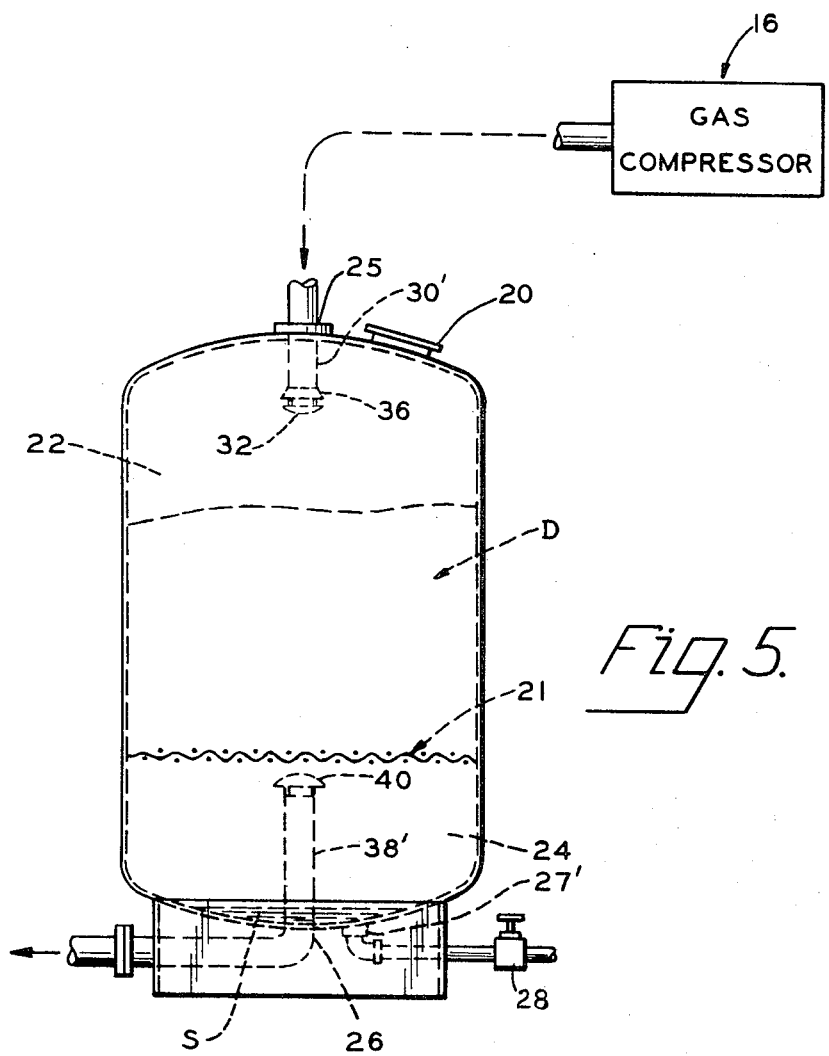

DELIQUESCENT DESICCANT GAS DRYER AND METHOD

This application is a continuation of Ser. No. 808,867, filed Mar. 20, 1969 and now abandoned.

This invention relates in general to dehydrating devices and more particularly to a novel dehydrating device of the deliquescent chemical type, for removing moisture and other impurities from compressed air or gas. The invention also relates to a novel method for drying an air or gas stream. Hereafter the use of the term gas will be understood to include air.

Various arrangements are known in the prior art for removing moisture and other impurities from pressurized gas. An extremely effective and comparatively uncomplicated arrangement for so accomplishing this purpose has been the use of a drier mechanism which utilizes a deliquescent chemical drying agent or desiccant to accomplish the moisture removal. This arrangement has generally comprised a housing or tank with a gas inlet and a gas outlet therein, and with a bed of deliquescent desiccant in particle or tablet-like form disposed intermediate the inlet and the outlet, with the inlet being disposed adjacent the bottom of the tank or housing and communicating with the underside of the bed, and the outlet being disposed adjacent the upper portion of the housing or tank above the bed, whereby the inlet gas moves upwardly through the bed of deliquescent desiccant chemical material, to have moisture and other impurities removed therefrom, and then the gas flows out the outlet. The moisture in the gas upon being attracted to the deliquescent desiccant bed, causes the bed to dissolve, and with the resultant solution draining down through the pervious bed to the bottom of the tank or housing, and thence generally out a drain for disposal. Accordingly, the deliquescent solution from the bed flows downwardly due to gravity, and in a direction opposite to the direction of movement of the gas upwardly through the desiccant mechanism. The incoming pressurized gas moving upwardly tends to maintain at least a portion of the solution in the bed, causing the desiccant particles or tablets to oftentimes become mushy, reducing the effectiveness of the drying operation, and causing the desiccant particles to cement together, thus reducing the porosity of the bed and hindering uniform movement of the pressurized gas therethrough. This oftentimes results in the necessity of early replacement of the bed of desiccant, in order to obtain a more uniform flow of gas therethrough for maintenance of the efficiency of the drying operation. Examples of prior art drying mechanisms are shown, for instance, in U.S. Pat. No. 3,246,453, issued Apr. 19, 1966 to Philip S. Becker and entitled "Moisture Removing Dryer Employing a Bed of Deliquescent Material," and U.S. Pat. No. 3,303,621 to Wilkes E. Hill, issued Feb. 14, 1967 and entitled "Gas Drier."

The present invention provides a deliquescent type compressed gas drier mechanism which has the gas inlet to the drier mechanism disposed in the upper portion thereof above the bed of deliquescent chemical material, and the gas outlet from the drier mechanism disposed beneath the bed of deliquescent chemical material, so that the flow of gas through the bed is in the same general direction as the direction of movement of the desiccant solution flowing down from the bed, thereby materially increasing the efficiency and effectiveness of the drying operation. The invention also provides a novel method of drying a compressed gas stream.

Accordingly, an object of the invention is to provide a novel arrangement of deliquescent desiccant type gas drier.

Another object of the invention is to provide a novel deliquescent desiccant type compressed gas drier which increases the efficiency of the drying operation on the compressed gas, and results in a longer service life for the bed of desiccant chemical material.

Another object of the invention is to provide a deliquescent desiccant type of gas drier comprising a housing having a gas pervious, generally horizontally disposed support means therein, dividing the housing into an upper chamber and a lower chamber, and with a porous bed of deliquescent desiccant supported on the support means, and having a gas outlet duct and a gas inlet duct for respectively withdrawing compressed gas from and inserting compressed gas into said housing, and wherein said inlet duct opens into the upper chamber above the bed of deliquescent chemical desiccant, and said outlet duct opens into said lower chamber below the bed of chemical desiccant.

A still further object of the invention is to provide a drier of the latter described type including baffle means coacting with the gas inlet for initially causing dispersal of the inlet gas upwardly in a direction away from the bed upon its entry into the housing interior from the inlet duct, and shield means coacting with the outlet duct to prevent solution dripping down from the desiccant bed, from entering the outlet duct.

A still further object of the invention is to provide a drier mechanism of the above described type wherein the inlet duct extends interiorly of the drier housing to substantially the vertical axis of the housing and wherein the outlet duct extends from adjacent the vertical axis to exteriorly of the housing.

A further object is to provide a novel method of drying a compressed gas stream.

Other objects and advantages of the invention will be apparent from the following description taken in conjunction with the accompanying drawings wherein:

FIG. 1 is a side elevational, generally diagrammatic, partially broken illustration of a deliquescent desiccant gas drier mechanism embodying the present invention;

FIG. 2 is a top plan view of the drier mechanism of FIG. 1;

FIG. 3 is an enlarged, fragmentary, side elevational view of the inlet duct and its associated baffle means;

FIG. 4 is an enlarged, fragmentary, side elevational view of the outlet duct and its associated shield means;

FIG. 5 is a side elevational, generally diagrammatic illustration of another embodiment of drier.

Referring now again to the drawings, there is shown a drier mechanism comprising a tank or housing 10 which may be of the cylindrical-like configuration illustrated having convex, dish-like upper and lower end portions 12 and 14. The drier housing may be formed of metal and is adapted to receive pressurized gas from a source 16 of such pressurized gas. Source 16 may represent, for example, an air compressor. There may be provided a support 18, which is of ring-like configuration in the embodiment illustrated, for standing the housing or tank in a generally upright condition. A filler hatch 20 may be provided in the upper end of the housing for inserting a bed D of chemical deliquescent desiccant particles, tablets or pellets into the housing.

Generally horizontally oriented support means, such as for instance a grid or screen 21, may be provided interiorly of the housing 10 for supporting the bed D of desiccant particles or pellets, and dividing such housing into an upper chamber 22 and a lower chamber 24. Support 21 may be supported on the side walls of the housing, or may be supported on the bottom wall or by any other suitable arrangement. The housing has a gas inlet 25 communicating with upper chamber 22 and a gas outlet 26 communicating with the lower chamber.

The aforementioned bed D of deliquescent desiccant material is disposed on the support member 21 with the bed being adapted to pass inlet gas therethrough and to remove moisture and other contaminants in the gas, from the gas, with the moisture causing deliquescense of the desiccant particles, with the resultant solution from the desiccant particles as the latter dissolve, draining down by gravity through the bed and into the bottom chamber 24. A drain 27 including a suitable control valve means 28 may be provided in the bottom wall of the housing, for draining the liquid solution S from the housing, and in the conventional manner.

The gas inlet 25 into the drier mechanism may include a duct 30 which in the embodiment illustrated in FIGS. 1 and 2 extends through the side of the drier housing into the upper chamber, and to approximately the vertical axis X-X of the housing 10, and then turns downwardly in a direction generally perpendicular toward the bed. The exit end of the inlet duct 30 is preferably provided with a baffle means 32 (FIG. 3) spaced from the exit end as by means of supports 34. The pressurized gas being emitted from the exit end of the inlet duct is adapted to strike the baffle means and be dispersed upwardly into the upper chamber, thereby reducing the velocity of the gas stream. The exit end of the inlet duct may have a shield portion 36 (FIG. 3) thereon, for deflecting desiccant particles when they are inserted into the drier housing via the entry closure 20, thereby preventing desiccant from accumulating on the baffle member 32. Baffle member 32 preferably has a concave or dished interior surface 37 which deflects the compressed gas being emitted from the exit end of inlet duct 30 upwardly into the upper reaches of upper chamber 22 of the drier housing, to thereby cause engagement of the incoming gas with the walls of the upper portion of the housing, which tends to cool the gas prior to its passage downwardly through the bed, and also provides for the uniform application of the gas to the top surface of the desiccant bed. It will be understood that the walls of the drier housing are usually at a lower temperature than the temperature of the inlet gas, the latter oftentimes being in the range of 100°–150° F.

The outlet 26 of the drier may include a duct 38 which extends for approximately the vertical axis of the drier housing out the side of the drier, and as illustrated in FIGS. 1 and 2. Outlet duct 38 preferably has a shield member 40 thereon which has an arcuate or inverted dished upper surface 42 for causing the solution draining down from the desiccant bed to be deflected off the shield member and down to the bottom of the housing for removal via the drain 27. The shield 40 may be spaced from the inlet end of the outlet duct as by means of support members 40a. As can be seen in FIG. 4, the shield 40 extends laterally of the opening to the outlet duct to insure that the solution dripping down from the bed does not enter the outlet duct, and provides adequate space for entry of the dried gas into the inlet end of the outlet duct.

The chemical deliquescent desiccant particles forming the bed may be of any suitable type, such as for instance the desiccant of U.S. Pat. No. 3,390,511, issued July 2, 1968 to Orlo C. Norton and entitled "Gas Drier Desiccant and Method of Preparation," but however, it will be understood that such specifically identified desiccant is not the only type that can be effectively utilized with the drier mechanism of the invention.

It will be seen that with the inlet gas entering the upper portion of the drier housing, there is no tendency for the incoming gas to disturb the accumulated solution S in the lower portion of the drier which usually contains substantial oil and scale, and therefore splashing and gas carrying of the solution upwardly into engagement with the underside of the bed and the supporting grid means 21 is eliminated. Moreover, the solution being emitted from the bed is not maintained in the bed by upwardly moving gas, but is actually forced downwardly from the bed by the downward flow of pressurized gas. This tends to maintain the particles of deliquescent desiccant in a dryer, non-mushy condition, insuring generally equal and uniform passage of the pressurized gas through the bed and preventing channelling in the bed, thereby materially increasing the efficiency of the drying operation.

The inlet gas entering the drier mechanism is preferably at a temperature no greater than approximately 150° F. and may be at a pressure from slightly above atmospheric to up to 20,000 p.s.i. gauge. The desiccant particles at the top of the bed take the greater portion of the drying load as this portion provides the first contact of the gas with the bed, and thus the greatest deliquescence of the desiccant particles occurs in the upper portion of the bed. The spacing or interstices between the desiccant particles is substantially maintained, especially in the lower portions of the bed, which provides for lesser restriction of the gas flow through the bed, and without the aforediscussed channelling conditions. Since the top surface of the bed is completely open and without any forced velocity increase created by limited openings in a support grid, the tendency toward channelling is markedly reduced. In conventional upward flow deliquescent type gas driers, the maximum area of openings in the support grid is approximately 30 percent of the total area of the support grid, which ordinarily causes a material increase of gas velocity when inlet gas is inserted from the underside of the bed of desiccant, thereby retarding the downward flow of solution from the bed. This situation does not exist with the inlet gas being passed into the bed from the top side thereof, and in upward vertically spaced relationship to the support grid. The downwardly moving gas through the bed also tends to cleanse the exterior surfaces of the desiccant particles or pellets of accumulated solution, forcing the latter downwardly through the bed with the flow of gas through the bed.

Referring now to FIG. 5, there is illustrated another embodiment which is generally similar to that of the first described embodiment, except that the gas inlet 25 and associated inlet duct 30' enters the housing 10' vertically at the vertical axis of the housing rather than from the side thereof. Likewise the outlet 26 and associated outlet duct 38' exits through the housing at the vertical axis of the housing rather than from the side thereof. With such an arrangement there is somewhat less turbulence of the gas stream in the inlet duct prior to its entry into impacting engagement with the baffle 32 adjacent the exit end of the inlet duct, and which increases the uniformity of gas flow from the inlet duct into the upper chamber. Also the drain 27' from the lower chamber 24 is offset from the gas outlet 26. In other respects, the FIG. 5 embodiment is generally similar to that of the first described embodiment.

From the foregoing description and accompanying drawings, it will be seen that the invention provides a novel deliquescent desiccant type of drier mechanism wherein the inlet gas is inserted into the drier mechanism in the upper portion thereof above the bed of deliquescent desiccant material and in upwardly spaced relation to the support means for the bed in the drier housing, and the outlet to the drier mechanism is disposed below the desiccant bed for removal of the gas from the lower chamber of the drier housing, and which results in a greater drying efficiency and a longer service life for the desiccant bed.

The terms and expressions which have been used are used as terms of description, and not of limitation, and there is no intention in the use of such terms and expressions of excluding any equivalents of any of the features shown or described, or positions thereof, and it is recognized that various modifications are possible within the scope of the terms and expressions utilized to describe the invention.

What is claimed is:

1. In a dryer for compressed gas comprising a closed housing having a gas inlet and a gas outlet, generally horizontally oriented gas pervious support means in said housing dividing the latter into an upper chamber and a lower chamber, said support means being adapted to support a bed of chemical deliquescent desiccant particles thereon for disposal between said inlet and said outlet, said bed of deliquescent desiccant particles being adapted to attract moisture from the gas as the latter passes generally vertically through the bed, and commence to dissolve into a liquid solution, drain means communicating with said lower chamber for removing solution therefrom which flows downwardly from said bed upon exposure of the latter to gas containing moisture, said gas inlet opening into said upper chamber above said support means and said gas outlet opening into said lower chamber below said support means, and abutment means coacting with said gas inlet to diffuse the gas stream outwardly in said upper chamber prior to passage of the gas downwardly through the bed of desiccant, said gas inlet comprising a duct extending into said housing from the exterior thereof to substantially the vertical axis of said housing and projecting downwardly in a direction towards said support means, the exit end of said duct being downwardly facing and in upwardly spaced relation to said abutment means and being adapted to be disposed in upwardly spaced relation to the upper level of the bed of chemical desiccant material, said exit end being of a materially smaller crossasectional area as compared to the area of said support means, said exit end being substantially aligned in a vertical direction with the entry end of said gas outlet, said entry end of said gas outlet having a materially smaller cross-sectional area as compared to the area of said support means.

2. A dryer in accordance with claim 1 including entry means in the upper portion of said housing for inserting desiccant particles into said housing onto said support means for forming the bed.

3. A dryer in accordance with claim 1 wherein said gas inlet duct extends into said housing from the exterior side thereof to substantially the vertical axis of said housing.

4. A dryer in accordance with claim 1 wherein said gas inlet duct extends into said housing from exteriorly of the latter at the vertical axis of the housing.

5. A dryer in accordance with claim 1 wherein said abutment means is of upwardly arcuate configuration operative to direct inlet gas exiting from said inlet duct into said upper chamber upwardly toward the upper portion of said housing prior to movement of the gas down through the bed.

6. In a dryer for compressed gas comprising a housing having a gas inlet and a gas outlet, generally horizontally oriented gas pervious support means in said housing dividing the latter into an upper chamber and a lower chamber, said support means being adapted to support a bed of chemical deliquescent desiccant particles thereon for disposal between said inlet and said outlet, said bed of deliquescent desiccant particles being adapted to attract moisture from the gas as the latter passes generally vertically through the bed, and commence to dissolve into a liquid solution, drain means communicating with said lower chamber for removing solution therefrom which flows downwardly from said bed upon exposure of the latter to gas containing moisture, said gas inlet opening into said upper chamber above said support means and said gas outlet opening into said lower chamber below said support means, baffle means adjacent the exit end of said gas inlet and coacting with said gas inlet to diffuse the gas stream in said upper chamber prior to passage of the gas downwardly through the bed of desiccant, said exit end facing downwardly toward said support means and being substantially aligned in a vertical direction with the entry end of said gas outlet, said baffle means being of upwardly arcuate configuration operative to direct inlet gas exiting from said gas inlet into said upper chamber upwardly toward the upper portion of said housing prior to movement of the gas down through the bed, entry means in the upper portion of said housing above said baffle means and in proximate relation to the latter for inserting desiccant onto said support means, and shield means coacting with said baffle means in upwardly spaced relation thereto to prevent accumulation of desiccant on said baffle means during insertion of desiccant onto said support means while permitting said baffle means to direct inlet gas upwardly into said upper chamber as the gas exits from said gas inlet, said shield means having obliquely sloping surface portions for directing desiccant toward said support means and preventing accumulation of desiccant on said shield means.

7. A dryer in accordance with claim 6 wherein said gas outlet comprises a duct extending from approximately the vertical axis of said housing to exteriorly of said housing, the entry end of said outlet duct facing upwardly.

8. In a method of drying a gas stream containing moisture comprising, providing a generally horizontally oriented gas pervious bed of chemical deliquescent particles, conducting the gas stream of substantially lesser cross-sectional area as compared to the area of said bed, to substantially the location of the vertical axis of the bed, diffusing the gas stream above the bed by impacting the gas stream against an upwardly facing baffle above the bed, passing the gas substantially vertically downwardly through the bed in the general direction of gravity flow of deliquescent solution from the bed, and withdrawing the gas from beneath the bed after the gas is passed through the bed at the general location of the vertical axis of the bed thus maintaining the withdrawal of the gas from beneath the bed at a location in general vertical alignment with the location of the initial application of the gas stream above the bed, the cross-sectional area of the withdrawal gas stream being materially less than the area of the bed.

9. A method in accordance with claim 8 including catching the desiccant solution from the bed beneath the latter, and discharging the collected solution.

10. In a dryer for compressed gas comprising, a closed housing having a gas inlet and a gas outlet, generally horizontally oriented gas pervious support means in said housing dividing the latter into an upper portion and a lower portion, said support means being adapted to support a bed of chemical deliquescent desiccant particles thereon for disposal between said inlet and said outlet, said bed of deliquescent desiccant particles being adapted to attract moisture from the gas as the latter passes through the bed and commence to dissolve into a liquid solution, drain means communicating with said lower portion of said housing for removing solution therefrom which flows downwardly from said support means upon exposure of the desiccant bed to gas containing moisture, said gas inlet opening into said housing above said support means and said gas outlet opening into said housing below said support means, means coacting with said gas inlet adapted to diffuse the gas stream to be emitted therefrom above the desiccant bed prior to passage of the gas downwardly through the bed, said gas inlet comprising a duct extending into said housing from the exterior thereof to substantially the vertical axis of said support means, the exit end of said duct being adapted to be disposed in upwardly spaced relation to the upper level of the bed of desiccant material, said exit end being of a materially smaller cross-sectional area as compared to the area of said support means, said exit end of said gas inlet and the entry end of said gas outlet being substantially aligned in a vertical direction with said entry end of said gas outlet having a materially smaller cross-sectional area as compared to the area of said support means.

11. A dryer in accordance with claim 7 wherein said outlet duct extends through the side of said dryer housing.

12. A dryer in accordance with claim 7 wherein said outlet duct extends through the bottom of said dryer housing at the vicinity of said vertical axis.

13. A dryer in accordance with claim 7 wherein said outlet duct includes shield means adjacent the entry end thereof for preventing entry of desiccant solution flowing down from the bed from entering said outlet duct.

14. A dryer in accordance with claim 6 wherein said housing comprises an upstanding generally cylindrical tank having arcuate upper and lower ends.

* * * * *